Jan. 31, 1928.

P. R. PINE

TRAP 1,657,482

Filed Jan. 10, 1927

Inventor
Paul R. Pine,

By Clarence A. O'Brien
Attorney

Patented Jan. 31, 1928.

1,657,482

UNITED STATES PATENT OFFICE.

PAUL R. PINE, OF SALINA, KANSAS.

TRAP.

Application filed January 10, 1927. Serial No. 160,232.

This invention relates to a construction of a trap particularly adapted for use in connection with washers of cleaning machines used in dry cleaning establishments.

An object of the invention resides in providing a trap constructed so that it will separate all soldered material washed from the clothes in the washer from the washing fluid, and which will further control the level of the washing liquid in the washing machine.

The invention further comprehends the provision of a trap construction wherein a main container is open at the upper end, and is formed with a supplemental chamber in which it slidably fits a plurality of tilted screens, one of which is formed with a suitable receptacle for receiving soldered material, separated by said screen, in which the cover will hold all of the parts in proper assembled relation, and which upon removal, will permit the removal of the screens, so that the collected solid matter can be readily removed and the screens replaced for the further operation of the washer, with which the trap is associated.

The invention comprehends numerous other objects residing in the specific details of construction, and arrangement of the parts for carrying out the invention, which are more clearly hereinafter set forth in the following detailed description directed to a preferred form of the invention, it being understood, however, that various changes in the size, shape and arrangement of the parts may be made without departing from the spirit and scope thereof as herein set forth.

In the drawings forming a part of this application:—

Figure 1:
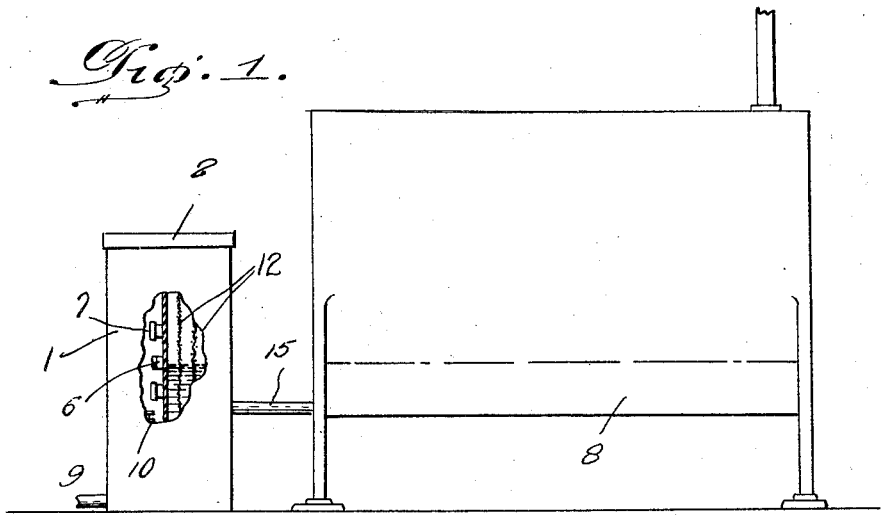
Figure 1 is a side elevation of a conventional type of washer, of the rotary type, showing the improved form of trap forming subject matter of this invention, in its proper associated relation therewith, portions of the body broken away to illustrate the manner in which the trap controls the liquid level in the washer.

This invention is more particularly designed for use with the class of washing machines which employ gasoline or other similar fluids, and includes a main casing 1, which is open at the upper end, and removably receives the cover 2, providing access to the interior thereof.

The inside of the casing 1 is provided with a small fluid level control chamber 3 formed by the vertical partition walls 4 in the central portion of the casing extending between the opposite side walls thereof which terminate in the bottom wall 5 spaced above the bottom of the container 1. The side wall 4 is provided with a plurality of openings in which are mounted the nipples 6 receiving the threaded caps 7, in liquid-tight relation.

These caps are adapted for manual application and removal on the nipples in order that the desired liquid height may be maintained in the washer 8, as illustrated in Fig. 1.

The bottom of the casing 1 is provided with an outlet pipe connection 9 for containing the contents of the casing outwardly to a suitable filtering apparatus which is not shown. The bottom of the liquid control chamber 3 is strained through the valve 10 mounted on the nipple threaded in the bottom of the side wall 4 forming this chamber 3.

Figure 2:
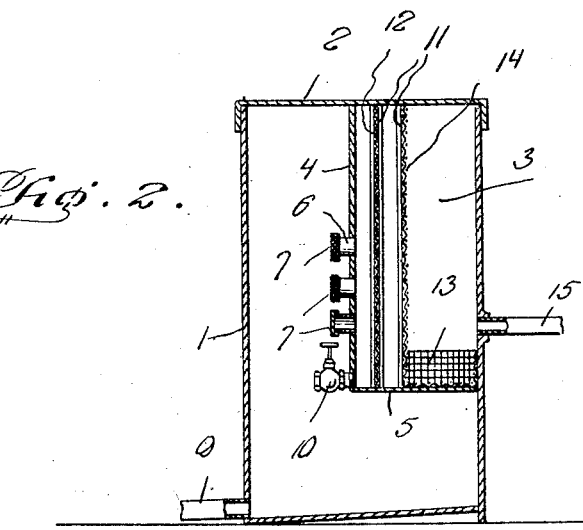
Fig. 2 is a vertical sectional view through the trap illustrating on a substantially larger scale, the details of construction thereof.

Suitable guides 11 are provided in spaced relation on the opposite side walls of the container 1, one of which slidably receives the tilted screen 12, and the other one of which slidably receives the basket 13, having one side extending upwardly throughout the height of the chamber 3 as clearly shown in Fig. 2, and indicated at 14. The discharge pipe 15 from the washer 8 is connected with the casing 1, so that it discharges immediately above the basket 13, as a result of which the fluid containing the solid matter washed in the clothes flows into the basket where the coarse solid matter is separated from the liquid.

The screen of the basket 13 including the elongated side portion 14 is of relatively large mesh, while the screen 12 is formed of wire having a substantially small mesh, in order that all of the solid content of the fluid will be separated therefrom.

The screen 12 as well as the basket 13 is readily removable from the casing 1 by sliding the same outwardly through the top thereof when the cover 2 is removed, while the cover serves to obtain these screens 12 and 13 in proper assembled relation in guides 11, provided on the side walls of the casing 1.

The operation of the washer 8 with the use of this invention, the desired level of operating liquid in the washer is obtained by removing the cap 7 from the nipple 6 at the desired height, there being a number of these nipples in vertically alined relation in order that any desired liquid level of predetermined character may be obtained and maintained in the machine.

This invention therefore serves a plural purpose in its operation in conjunction with a washing machine of a cleaning machine system, which separates the solid matter from the liquid in the basket 13 in which it is readily removable from the casing for the insertion of the new basket, and which effectively controls the operating level of liquid, in the washing machine with which it is associated, and which further controls the straining of the washer through the valve 10.

Having thus described my invention, what I claim as new is:—

1. A trap of the class described, comprising a casing open at the upper end, a cover means for said casing, means dividing said casing into a pair of compartments, means for controlling the liquid level in one compartment in a predetermined manner, a filter basket removably mounted in said compartment for separating solid matter from fluid, an inlet connection with the casing above the basket, and an outlet connection with the bottom of the casing from the other compartment.

2. A trap of the class described, comprising a casing having an open upper end, a vertical partition extending between opposite sides of the casing dividing the same into a pair of compartments, said partition terminating in a laterally extending bottom portion above the bottom of the casing, each of said compartments opening through said open upper end of the casing, a cover for the upper end of said casing, guides formed in the casing within the compartment formed by said partition and lateral extension thereon, filter screens slidably mounted in said guides, one of said filter screens being formed with a basket on the lower end, an inlet to said casing above the basket for the filter screens, a plurality of outlet openings formed in the partition wall in vertical alinement, means for controlling said outlet openings in a predetermined manner, and a drain pipe connected with the bottom of the casing.

3. The combination with a washer of a trap, having a casing open at the upper end, a vertical partition wall dividing said casing into a pair of compartments, filtering means in one of said compartments, an inlet from the bottom of said washer to the last named compartment of said casing, a plurality of vertically alined openings formed in said partition walls, means for controlling communication between said compartments in the casing through said openings, whereby the control of communication between the compartments in the casing will automatically control the liquid level in the washer to obtain the same liquid level in the washer and tub.

In testimony whereof I affix my signature.

PAUL R. PINE.